United States Patent
Yap et al.

(10) Patent No.: US 7,379,653 B2
(45) Date of Patent: May 27, 2008

(54) AUDIO-VIDEO SYNCHRONIZATION FOR DIGITAL SYSTEMS

(75) Inventors: Adrian Yap, Gaithersburg, MD (US); Scott Casavant, Germantown, MD (US); Hsien-Hua Lee, N. Potomac, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 1338 days.

(21) Appl. No.: 10/079,992

(22) Filed: Feb. 20, 2002

(65) Prior Publication Data

US 2003/0156342 A1    Aug. 21, 2003

(51) Int. Cl.
*H04N 9/80* (2006.01)
*H04N 9/89* (2006.01)
*H04N 7/12* (2006.01)
*G11B 27/00* (2006.01)
*H04J 3/06* (2006.01)
*H04B 1/66* (2006.01)

(52) U.S. Cl. ............... 386/12; 386/4; 386/17; 386/52; 348/423.1; 348/425.4; 348/466; 348/467; 370/503; 375/240.28

(58) Field of Classification Search ............ 348/423.1, 348/425.4, 466, 467, 501, 512, 513, 515, 348/518; 360/69; 386/4, 12, 13, 39, 46, 386/51, 52, 71, 92, 96, 98, 101, 104, 105, 386/109, 125, 126; 370/503; 375/240.01, 375/240.26, 240.28

See application file for complete search history.

(56) References Cited

U.S. PATENT DOCUMENTS

| 5,537,409 | A  | * | 7/1996  | Moriyama et al. | 370/471    |
|-----------|----|---|---------|-----------------|------------|
| 5,668,601 | A  | * | 9/1997  | Okada et al.    | 375/240.25 |
| 5,784,527 | A  | * | 7/1998  | Ort             | 386/111    |
| 6,130,987 | A  | * | 10/2000 | Tanaka          | 386/96     |
| 6,262,777 | B1 | * | 7/2001  | Brewer et al.   | 348/515    |
| 6,842,580 | B1 | * | 1/2005  | Ueda et al.     | 386/125    |
| 6,931,071 | B2 | * | 8/2005  | Haddad et al.   | 375/240.28 |
| 6,952,521 | B2 | * | 10/2005 | Kelly et al.    | 386/52     |
| 6,996,326 | B2 | * | 2/2006  | Koshino et al.  | 386/47     |

\* cited by examiner

*Primary Examiner*—Thai Q. Tran
*Assistant Examiner*—Syed Y. Hasan (57) ABSTRACT

The audio-video synchronization process ensures continuity of displayed AV data. To initialize the process, a transport processor determines whether an occupancy criterion of a buffer storing received audio and video frames has been met. If the criterion is met, the transport processor obtains an initial time stamp value from an initial frame, and a subsequent time stamp value from a subsequent frame. Initial and subsequent parameters are computed from these respective time stamp values, and are compared against each other. If the parameters coincide, the frame is valid, and corresponding audio or video frames may be decoded and displayed. If the parameters do not coincide, a recovery process is initiated. In either event, the invention makes it possible to achieve audio-video synchronization for both live and playback modes of a digital video recorder (DVR).

30 Claims, 7 Drawing Sheets

AUDIO-VIDEO SYNCHRONIZATION FOR DIGITAL SYSTEMS

BACKGROUND OF THE INVENTION

1. Field of the Invention

This invention generally relates to digital recording systems, and more particularly to a method and apparatus for synchronizing audio and video frames received in digital television and/or digital video recording (DVR) systems.

2. Description of Related Art

In general, digital video and audio signals can be broadcast, processed, and recorded with a high degree of quality. In order to take better advantage of the high quality associated with digital video/audio, digitally-based peripheral devices, such as digital video cassette recorders (DVCR's) and digital video disks (DVD's), have been developed to receive and process video/audio in a digital format. Systems employing such devices receive broadcast entertainment-type data, such as packetized digital video, audio, data, and control signals received in a direct broadcast satellite (DBS) system, and effectively record the received data on a device such as a digital video recorder (DVR).

Within these packetized transport streams, or transport packets, resides data that, when de-multiplexed by the user or subscriber, transforms into a group of pictures, or GOP. A GOP consists of coded pictures. A coded picture may be a frame or field. Current digital video recorders (DVRs) include some type of transport processor to process received transport packets from any of a cable, satellite, video-on-demand or other broadcast source. Known as a transport packet processor or simply "transport processor", the transport processor is typically required to perform real-time functions and operations such as conditional access, program guide control, etc.

One particular function of transport processor software is to use the software, working in tandem with an MPEG decoder, to ensure that audio and video frames are synchronized prior to being displayed for either a live broadcast, or a recorded event, program or broadcast on a suitable display device such as an HDTV, video monitor, etc.

AV synchronization cannot be achieved for live and playback modes without the use of additional hardware components. In a typical digital broadcast system, AV synchronization is achieved by using a System Clock Reference (SCR). The SCR is frequently embedded in the data stream and in a corresponding time stamp (TS) when the SCR is received by the system. Typically, the TS must be latched through a hardware component handling the transport stream. Therefore, for proper AV synchronization of a recorded event, these SCR and TS values are also required to be recorded, in addition to the entertainment content. This is so an inter-arrival time between the packets that are to be recorded is maintained. This adds to complexity of the system, as well as to the cost, since greater storage is required. This may result in slower system processing time. Moreover, if each frame does not have a corresponding SCR and TS therein, or the SCR and/or TS is not properly recorded, processing of these audio and video frames of the displayed program or event may create errors, such as a program where the audio portion lags or leads the corresponding video portion. Such is undesirable whether watching live or recorded content.

SUMMARY OF THE INVENTION

The present invention provides an audio-video (AV) synchronization process and transport processor that improves continuity of displayed AV data. To initialize the synchronization process, a transport processor determines whether an occupancy criterion of a buffer storing received audio and video frames has been met. If the buffer criterion is met, the transport processor obtains a first time stamp value from a first frame, and a second time stamp value from a second and subsequent frame. First and second parameters are computed from these respective time stamp values, and are compared against each other. If the parameters coincide, the corresponding audio or video frames are decoded and displayed. If the parameters do not coincide, a recovery process is initiated. In either event, the invention makes it possible to achieve audio-video synchronization for both live and playback modes of a digital video recorder (DVR).

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, wherein like elements are represented by like reference numerals, which are given by way of illustration only and thus are not limitative of the present invention and wherein.

DETAILED DESCRIPTION

The synchronization method of the invention is useful for various DVR applications that are similar to those currently available on commercial DVR systems. The method makes it possible to achieve audio-video synchronization for live and playback modes without requiring additional hardware components for synchronizing audio and video frames.

The method specifies a technique for achieving audio-video synchronization without referencing a system clock reference (SCR). The SCR need not even be recorded. A video presentation time stamp ($PTS_V$) serves as a master reference in order to determine whether PTS of successive video frames are valid. An audio presentation time stamp $PTS_A$ is slaved to the $PTS_V$, such that, based on the validity of the $PTS_V$, the audio frame may be synchronized with its corresponding video frame. In addition, the synchronization algorithm is robust enough such that every audio frame can be decoded without any annoying audio errors.

The method achieves audio-video synchronization for both live content and playback modes in a DVR system. Furthermore, every audio frame is decoded. There is no audio error (e.g., glitch), even where several $PTS_V$ of successive video frames are corrupted or missing. The invention is applicable to any current or future DVR, cable/satellite, video-on-demand (VOD) or other broadcast source products. However, before describing the above features in greater detail, an exemplary basic architecture and operation is described in order to provide a context for the method and apparatus of various embodiments of the present invention.

Figure 1:
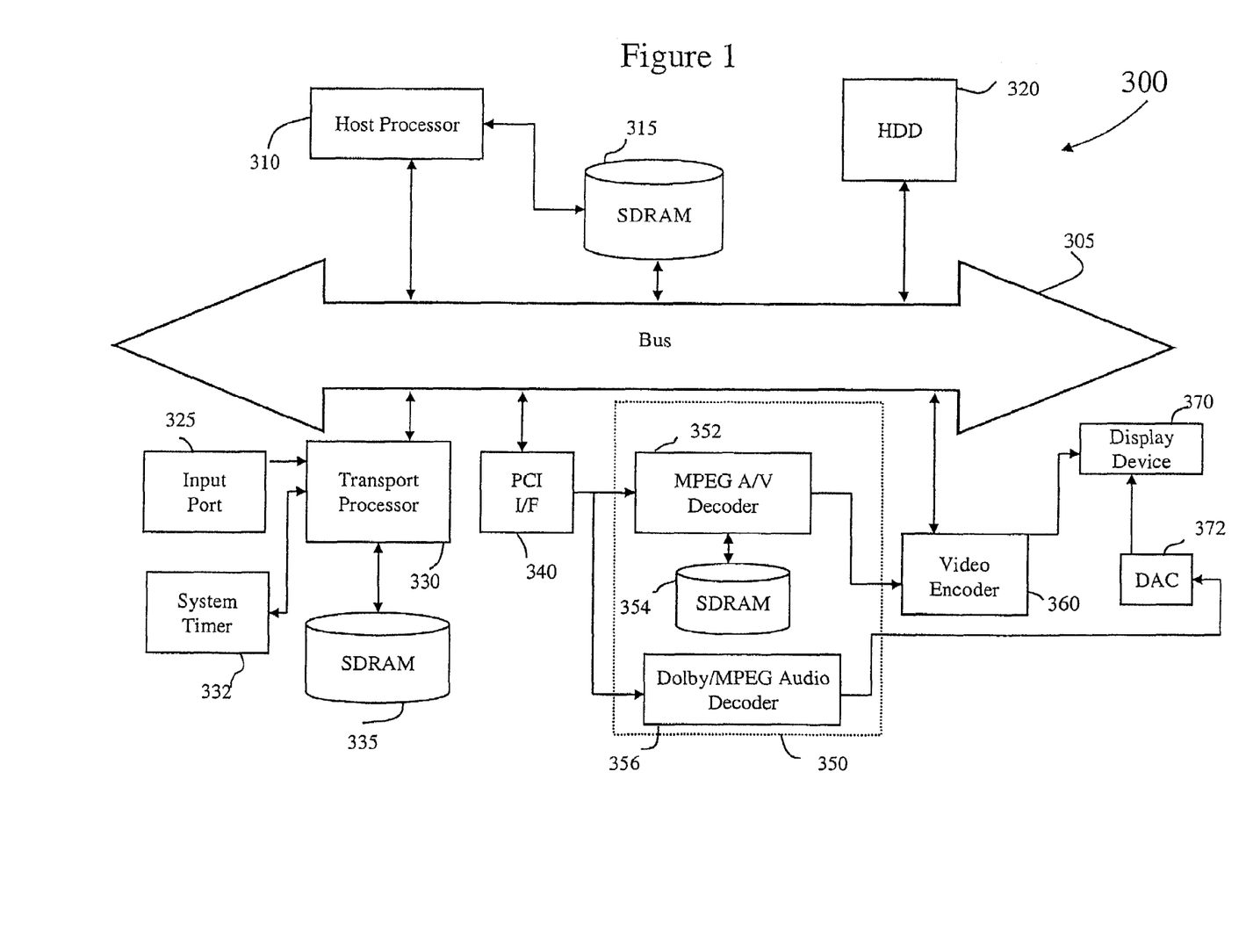
FIG. 1 is a block diagram of an exemplary architecture of a device equipped with a DVR in accordance with one embodiment of the present invention.

FIG. 1 is a block diagram of an exemplary architecture of a device equipped with a DVR in accordance with one embodiment of the present invention. The device 300 utilizes a bus 305 to interconnect various components and to provide a pathway for data and control signals.

FIG. 1 illustrates a host processor 310, a memory device 315 (in an exemplary configuration embodied as an SDRAM 315) and a mass storage device (HDD) 320 connected to the bus 305. The host processor 310 may also have a direct connection to SDRAM 315.

As further shown in FIG. 1, a transport processor 330 and an I/F 340, which may in an exemplary embodiment be a peripheral component interconnect interface (PCI I/F) are connected to the bus 305. The transport processor 330 also has a connection to input port 325 and SDRAM 335. Furthermore, I/F 340 is connected to a decoder 350. The decoder 350 is connected to a television encoder 360. The output of television encoder 360 is in turn sent to a display device 370. Decoder 350 may include both an MPEG A/V decoder 352 and a DOLBY DIGITAL®/MPEG audio decoder 356, the output of the latter being sent to display device 370 after conversion in a digital-to-analog converter (DAC) 372.

The host processor 310 may be constructed with conventional microprocessors such as the currently available Pentium™ processors from Intel. Host processor 310 performs real-time and non real-time functions in the device 300, such as graphics-user interface and browser functions.

HDD 320 is actually a specific example of a mass storage device. In other words, the HDD 320 may be replaced with other mass storage devices as is generally known in the art, such as a hard disc drive (HDD) or any known magnetic and/or optical storage devices, (i.e., embodied as RAM, a recordable CD, a flash card, memory stick, etc.). In an exemplary configuration, HDD 320 may have a capacity of at least about 25 Gbytes, where preferably about at least 20 Gbytes is available for various recording applications, and the remainder flexibly allocated for pause applications in device 300. This is only one example, as the mass storage device is not limited to the above capacity and may be configured to be equal to any known or used capacity, higher or lower in size than the example.

The bus 305 may be implemented with conventional bus architectures such as a peripheral component interconnect (PCI) bus that is standard in many computer architectures. Alternative bus architectures could, of course, be utilized to implement bus 305.

The transport processor 330 performs real-time functions and operations such as conditional access, program guide control, etc., and may be constructed with an ASIC (application specific integrated circuit) that contains, for example, a general purpose R3000A MIPS RISC core, with sufficient on-chip instruction cache and data cache memory. Furthermore, the transport processor 330 may integrate system peripherals such as interrupt controllers, timers, and memory controllers on-chip, including ROM, SDRAM, DMA controllers; a packet processor, crypto-logic, PCI compliant PC port, and parallel inputs and outputs. The implementation shown in FIG. 1 actually shows the SDRAM 335 as being separate from the transport processor 330, it being understood that the SDRAM 335 may be dispensed with altogether or consolidated with SDRAM 315. In other words, the SDRAMs 315 and 335 need not be separate devices and can be consolidated into a single SDRAM or other memory device.

Operatively connected to transport processor 330 is a system timer 332. System timer 332 keeps the operational time for the device 300, and in an exemplary embodiment may be a 27 MHz clock. Referring to FIG. 1, and as will be explained further below, when content embodied as transport packets of A/V data are received by device 300, they may be temporarily stored or buffered in SDRAM associated with transport processor 330, such as in SDRAM 335. The output of the transport processor 330, which may include MPEG-2 video elementary streams and MPEG-1 system packet streams (audio), for example, are temporarily stored in SDRAM 354.

The MPEG A/V decoder 352 generates an interrupt to transport processor 330 when a PTS is detected by the MPEG decoder 352. The interrupt informs the transport processor 330 that a presentation time stamp (PTS) has been received. The transport processor reads the PTS and stores the value for later processing in SDRAM 335. The PTS is used in the synchronizing algorithms that are to be explained hereafter, together with timer values that are to be latched from system timer 332 based on the PTS.

The input port 325 receives packetized audiovisual bitstreams that may contain, for example, MPEG-1 and/or MPEG-2 video bitstreams, MPEG-1 layer II audio bitstreams and DOLBY DIGITAL® audio bitstreams. Additionally, the present application is not limited to a single input port 325 as the device 300 may receive audiovisual bitstreams via a plurality of input ports 325.

Exemplary A/V bitrates may range from about 60 Kbps to 15 Mbps for MPEG video, from about 56-384 Kbps for MPEG audio, and between about 32-448 Kbps for DOLBY DIGITAL® audio. The single-stream maximum bitrate for device 300 may correspond to the maximum bitrate of the input programming, for example 16 Mbps or 2 MBps, which corresponds to the maximum MPEG-2 video bitrate of 15 Mbps, maximum MPEG-1 Layer-2 audio bitrate of 384 kbps, and maximum DOLBY DIGITAL® bitrate of 448 kbps. These bitrates are merely exemplary and the system and method of the present invention is not limited to these exemplary bitrates.

Of course, various other audiovisual bitstream formats and encodation techniques may be utilized in recording. For example, device 300 may record a DOLBY DIGITAL® bitstream, if DOLBY DIGITAL® broadcast is present, along with MPEG-1 digital audio. Still further, the received audiovisual data may be encrypted and encoded or not encrypted and encoded. If the audiovisual data input via the input port 325 to the transport processor 330 is encrypted, then the transport processor 330 may perform decryption. Moreover, the host processor 310 may perform the decryption instead.

Alternatively, the host processor 310 and transport processor 330 may be integrated or otherwise replaced with a single processor. As mentioned above, the SDRAMs (315 and 335, or 335 and 354) may be consolidated or replaced with a single SDRAM or single memory device.

The I/F 340 may be constructed with an ASIC that controls data reads from memory. Audiovisual (A/V) data may be sent to the host processor 310's memory and eventually stored in HDD while simultaneously being sent to an MPEG A/V decoder 352.

As previously noted, decoder 350 may be constructed as shown in FIG. 1 by including the MPEG A/V decoder 352 connected to the I/F 340, as well as an DOLBY DIGITAL®/MPEG audio decoder 356 which is also connected to the I/F 340. In this way, decoders 352 and 356 can separately decode the video and audio bitstreams from the I/F 340, respectively. Alternatively, a consolidated decoder may be utilized that decodes both video and audio bitstreams together. As mentioned above, the encoding techniques are not limited to MPEG and DOLBY DIGITAL® and can include any known or future developed encoding technique. In a corresponding manner, the decoder 350 could be constructed to process the selected encoding technique(s) utilized by the particular implementation desired.

In order to more efficiently decode the MPEG bitstream, the MPEG A/V decoder 352 may also include a memory device such as the aforementioned SDRAM 354 connected thereto. This SDRAM 354 may be eliminated, consolidated with decoder 352 or consolidated with the other SDRAMs 315 and/or 335. SDRAM 354 stores the audio and video frames that have been received and decoded but have not yet been synchronized for display on device 370.

Television encoder 360 is preferably an NTSC encoder that encodes, or converts the digital video output from decoder 350 into a coded analog signal for display. Regarding the specifications of the NTSC (National Television Standards Committee) encoder 360, the NTSC is responsible for setting television and video standards in the United States. The NTSC standard for television defines a composite video signal with a refresh rate of 60 half-frames (interlaced) per second. Each frame contains 525 lines and can contain 16 million different colors.

In Europe and the rest of the world, the dominant television standards are PAL (Phase Alternating Line) and SECAM (Sequential Color with Memory). Whereas NTSC delivers 525 lines of resolution at 60 half-frames per second, PAL delivers 625 lines at 50 half-frames per second. Many video adapters or encoders that enable computer monitors to be used as television screens support both NTSC and PAL signals. SECAM uses the same bandwidth as PAL but transmits the color information sequentially. SECAM runs on 625 lines/frame.

Thus, although use of NTSC encoder 360 is envisioned to encode the processed video for display on display device 370, the present invention is not limited to this standard encoder. PAL and SECAM encoders may also be utilized. Further, hi-definition television (HDTV) encoders may also be viable to encode the processed video for display on a HDTV, for example.

Display device 370 may be an analog or digital output device capable of handling a digital, decoded output from the television encoder 360. If analog output device(s) are desired, to listen to the output of the DOLBY DIGITAL®/MPEG audio decoder 356, a digital-to-analog converter (DAC) 372 is connected to the decoder 350. The output from DAC 372 is an analog sound output to display device 370, which may be a conventional television, computer monitor screen, portable display device or other display devices that are known and used in the art. If the output of the DOLBY DIGITAL®/MPEG audio decoder 356 is to be decoded by an external audio component, a digital audio output interface (not shown) may be included between the DOLBY DIGITAL®/MPEG audio decoder 356 and display device 370. The interface may be a standard interface known in the art such as a SPDIF audio output interface, for example, and may be used with, or in place of DAC 372, depending on whether the output devices are analog and/or digital display devices.

Figure 2:
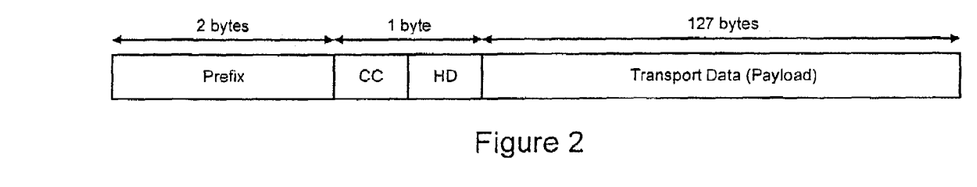
FIG. 2 illustrates the general structure of a transport packet.

FIG. 2 illustrates the general structure of a transport packet that carries the audio and video frames which require synchronization in accordance with the invention. The packet shown in FIG. 2 is an exemplary DIRECTV® packet structure; although the present invention is not limited to this structure, but is applicable to any known or future transport packet structure. As seen in FIG. 2, the transport protocol format defines a 130-byte packet containing a Prefix, Continuity Counter, Header Designator and Transport Payload. The 2-byte Prefix consists of four bits of control information and 12 bits of Service Channel Identification (SCID). The first two bytes of the 130-byte long packet are used for the Prefix, the third byte contains four bits for the Continuity Counter (CC) and four bits for a Header Designator (HD) while the remaining 127 bytes carry the payload.

The transport packet with HD field set to $01X0_b$ carries Basic Video Service (MPEG video data) information. Alternatively instead of MPEG video data, the transport packet may carry Basic Audio Service information (i.e., MPEG-1 audio data or DOLBY DIGITAL® audio data). For clarity, the transport packet in FIG. 2 is described in terms of video. The $HD_1$ bit, indicated by X in $HD=01X0_b$, toggles with each basic video service packet containing a picture start code. For these packets, the picture header start code is packet-aligned to be the first four bytes of the MPEG video data payload following the CC and HD fields. No other packets will toggle the $HD_1$ bit.

Figure 3A:
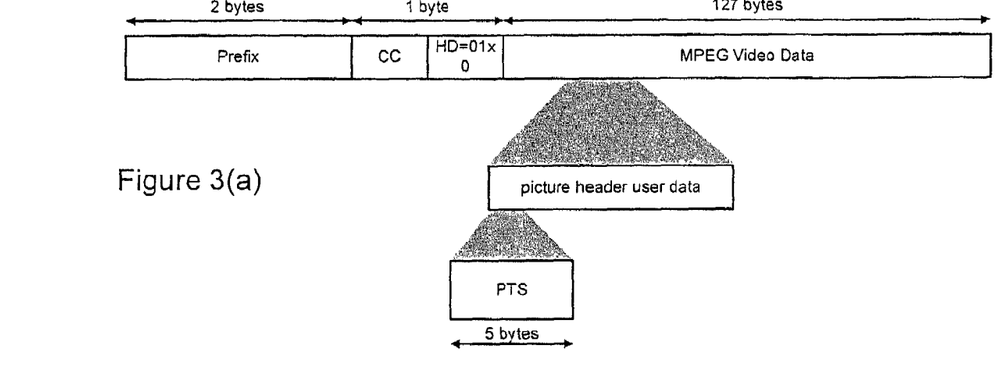
FIG. 3(a) illustrates an exemplary video service packet and transport packet structure in accordance with the invention.

FIG. 3(a) illustrates the basic video service transport packet format in accordance with the invention. All information may be transmitted in a variation of this format, including video, audio, program guide, conditional access and other data.

As noted above, each data packet is preferably about 130 bytes long (a byte is made up of 8 bits); but the present invention is not to be limited to this packet length. The first two bytes of information contain the service channel ID (SCID) and flags. The SCID is a unique 12-bit number that uniquely identifies the particular data stream to which a data packet belongs. The flags are made up of four bits, including bits to indicate whether or not the packet is encrypted and which key (A or B) to use for decryption.

The next, or third byte contains four bits for the Continuity Counter (CC) and Header Designator (HD), while the remaining 127 bytes carry the payload, seen here as MPEG Video data. In general, the Continuity Counter increments once for each packet received with the same SCID value. After CC reaches its maximum value 15 ($1111_b$), the CC wraps to 0 ($0000_b$). The transport payload includes the data that is the actual usable information sent from the program provider (MPEG video data, DOLBY DIGITAL® audio data for example). Such packets may have less than 127 bytes of useful data.

Further as seen in FIG. 3(a), the transport payload includes picture header user data and a 5-byte video presentation time stamp ($PTS_V$). The picture header user data contains picture related information such as presentation and decode time stamps, pan and scan information, closed caption and extended data services, etc. Also included is a user data start code string of 32 bits set to 00 00 01 $B2_h$, an 8-bit user data length field specifying the length in bytes of user data type and user data into fields; an 8-bit user data type field code, which for the $PTS_V$ is set to $02_h$. The $PTS_V$ indicates the intended time of presentation in the device 300 of the first field of the associated frame. It is to be understood that the transport payload is not limited to the above structure, and may be configured as other known or future transport payloads.

Figure 3B:
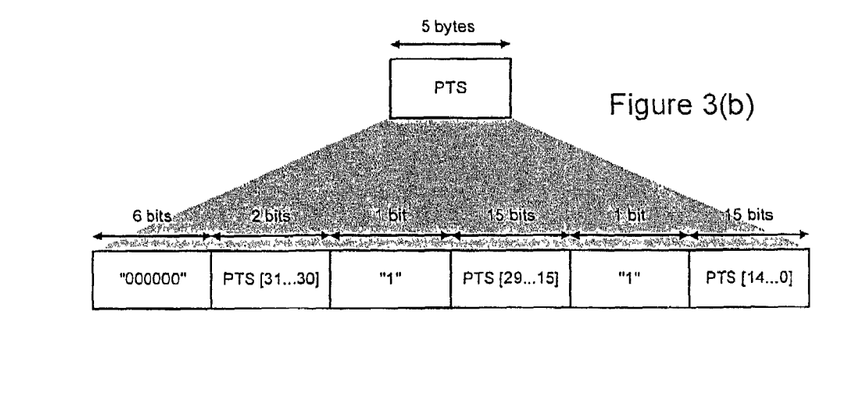
FIG. 3(b) illustrates an exemplary video presentation time stamp (PTS) contained in the transport packet structure of FIG. 3(a)

FIG. 3(b) illustrates an exemplary video presentation time stamp (PTSV) contained in the transport payload of FIG. 3(a). The $PTS_V$ is a 32-bit number coded in three separate fields, [31 . . . 30], [29 . . . 15], [14 . . . 1]. It indicates the intended time of presentation in the device 300 of the first field on the associated frame. A $PTS_V$ is present for each encoded frame and shall be the first user data info in user data field. As an example, for DIRECTV® applications, the value of $PTS_V$ is measured in the number of periods of a 27 MHz system clock. For MPEG, the $PTS_V$ is measured in the number of periods of a 90 KHz system clock. An increment of one in an MPEG $PTS_V$ is equivalent to 300 cycles of a DIRECTV® $PTS_V$.

Figure 4A:
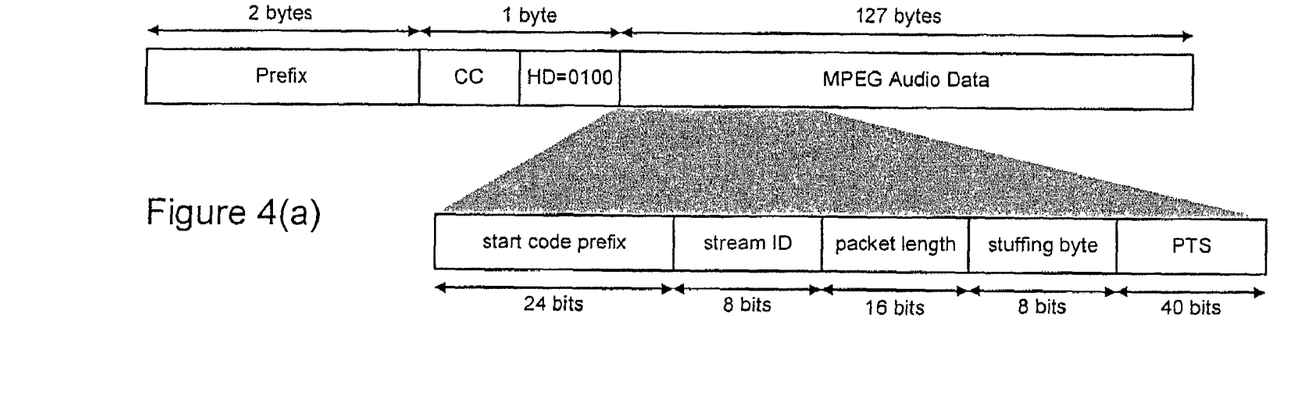
FIG. 4(a) illustrates an exemplary audio service packet and transport packet structure in accordance with the invention.

FIG. 4(a) illustrates an exemplary audio service packet and transport packet structure in accordance with the invention. This structure is similar to that shown in FIG. 3(a), but the transport payload includes MPEG-1 audio or DOLBY DIGITAL® audio data. These transport packets are identified with the HD field set to $0100_b$. Additionally, the transport block structure includes a start code prefix, stream ID with value set to $C0_h$, packet length, stuffing byte and audio presentation time stamp ($PTS_A$). A $PTS_A$ is always present in each MPEG-1 system packet. This value is measured in the number of cycles of the 27 MHz system clock. A $PTS_A$ is also present for DOLBY DIGITAL packets, the difference being that the $PTS_A$ is based on a 90 KHz system clock.

Figure 4B:
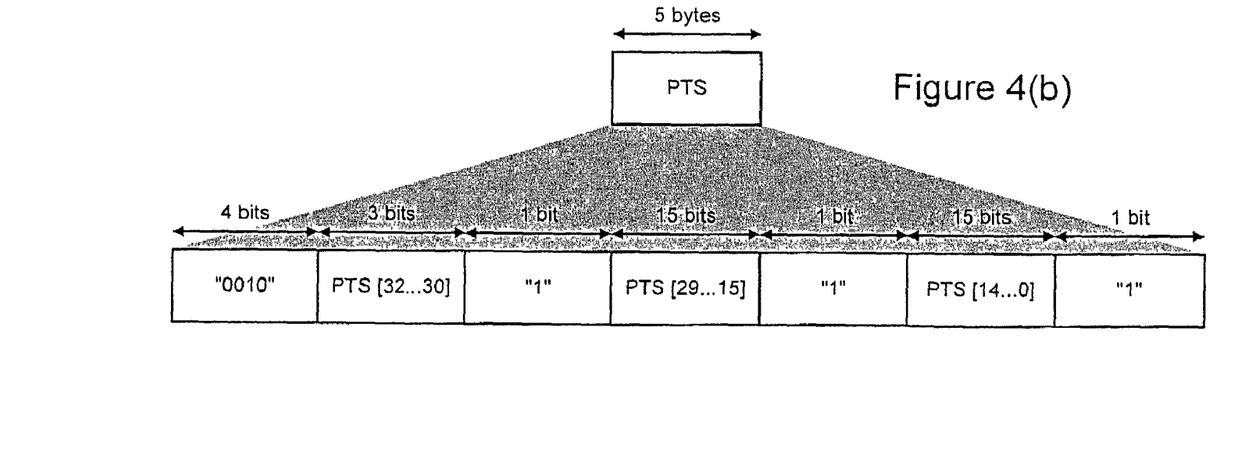
FIG. 4(b) illustrates an exemplary audio PTS contained in the transport packet structure of FIG. 4(a)

FIG. 4(b) illustrates an exemplary audio PTS contained in the transport packet structure of FIG. 4(a). As seen in FIG. 4(a), $PTS_A$ includes a 33-bit coded number spread across three (3) fields. The $PTS_A$ indicates the intended time of presentation in the device 300 of the associated audio frame. Similar to the $PTS_V$ for video frames, a $PTS_A$ is present for each encoded audio frame. As an example, for DIRECTV® applications, the value of $PTS_A$ is measured in the number of periods of a 27 MHz system clock; for DOLBY DIGITAL, $PTS_A$ is measured in the number of periods of a 90 KHz system clock.

Figure 5:
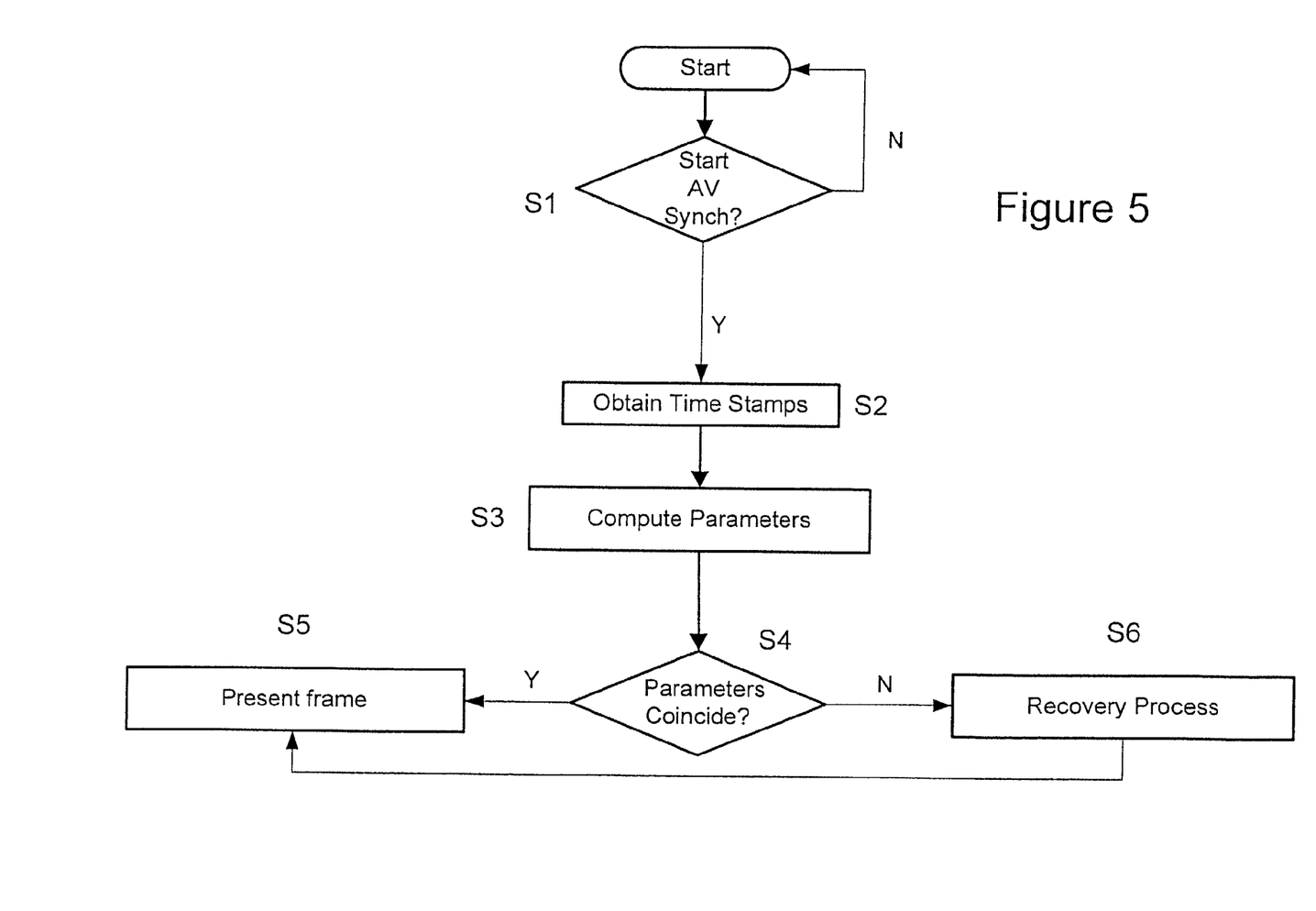
FIG. 5 illustrates a process of determining valid video presentation time stamps for AV synchronization in accordance with the invention.

FIG. 5 illustrates a process of determining valid video presentation time stamps for AV synchronization in accordance with the invention. This process is described with respect to video frames. Although the algorithm is described with respect to video frames, the invention also applies when it is described with respect to audio frames. An even larger additional buffer space in the SDRAM 354 of MPEG A/V decoder 352 is required when the algorithm is based on audio frames. For this figure, reference should be made to FIG. 1 where necessary. It is assumed that the audio or video data (frames) of an exemplary live broadcast (packetized frames) is received at input port 325 and sent to transport processor 330. The output of transport processor 330 is sent to decoder circuitry 350,. If the content is recorded and stored in HDD 320, then recorded content (accessed from HDD 320 by host processor 310) is sent to decoder circuitry 350 via bus 305 and I/F 340. Either live or recorded content is being temporarily buffered in SDRAM 354, until these frames are processed by MPEG A/V decoder 352 for eventual decoding and display on display device 370.

FIG. 5 illustrates one part of the AV synchronization process in accordance with the invention. An efficient process or algorithm for achieving audio-video synchronization during live and playback modes requires that the recording is done in video elementary streams, MPEG-1 audio system packets, and DOLBY DIGITAL® PES (Packetized Elementary Stream) packets. These elementary streams are used so that, upon playback, the transport processor 330 does not have to perform a second transport processing evolution, which would slow system processing speed. The process below is described in terms of using video frame data, but the process is equally applicable to audio data, as will be detailed further below.

The algorithm is run by and under direction of the transport processor 330. A start event, such as a channel change or power up of device 300 triggers operation. To initialize the synchronization process (Step S1), transport processor 330 determines whether an occupancy criterion of SDRAM 354, which is temporarily storing (buffering) received audio and/or video frames, has been met. If the criterion is not met, SDRAM 354 continues to fill with received frames, but no synchronization process is initiated.

If the size criterion in SDRAM 354 is met, then the transport processor 330 obtains a first presentation time stamp ($PTS_V$) value from a first video frame in SDRAM 354, and a second time stamp value from a second (subsequent) video frame (Step S2). The two $PTS_V$'s each are represented by an interrupt signal that is sent from MPEG A/V decoder 352 to the transport processor 330. The interrupt is a signal that tells the transport processor 330 to access the system time from timer 332, at that instant in time when the $PTS_V$ is physically extracted from SDRAM 354 by transport processor 330 for reading and storing.

This accessing of time may be effected by a software latch, as is known, with the latched values representing the time a first and a subsequent videopresentation time stamps ($PTS_V$) are detected by MPEG decoder 352. The latched time values are then used with their corresponding $PTS_V$'s to compute two parameters (Step S3) that are to be compared by the transport processor 330 (Step S4) to determine if they coincide. If the first and second parameters coincide, the $PTS_V$ of the subsequent video frame (frame that is being compared to reference) is valid. Since the $PTS_V$ is valid, the corresponding video frame is presented (Step S5) to MPEG A/V decoder 352, to be decoded and then displayed on display device 370. If the parameters do not coincide, a recovery process (Step S6) is initiated. In either event, the method enables the ability to determine valid $PTS_V$ for video frames for both live and playback modes of a digital video recorder (DVR).

Figure 6:
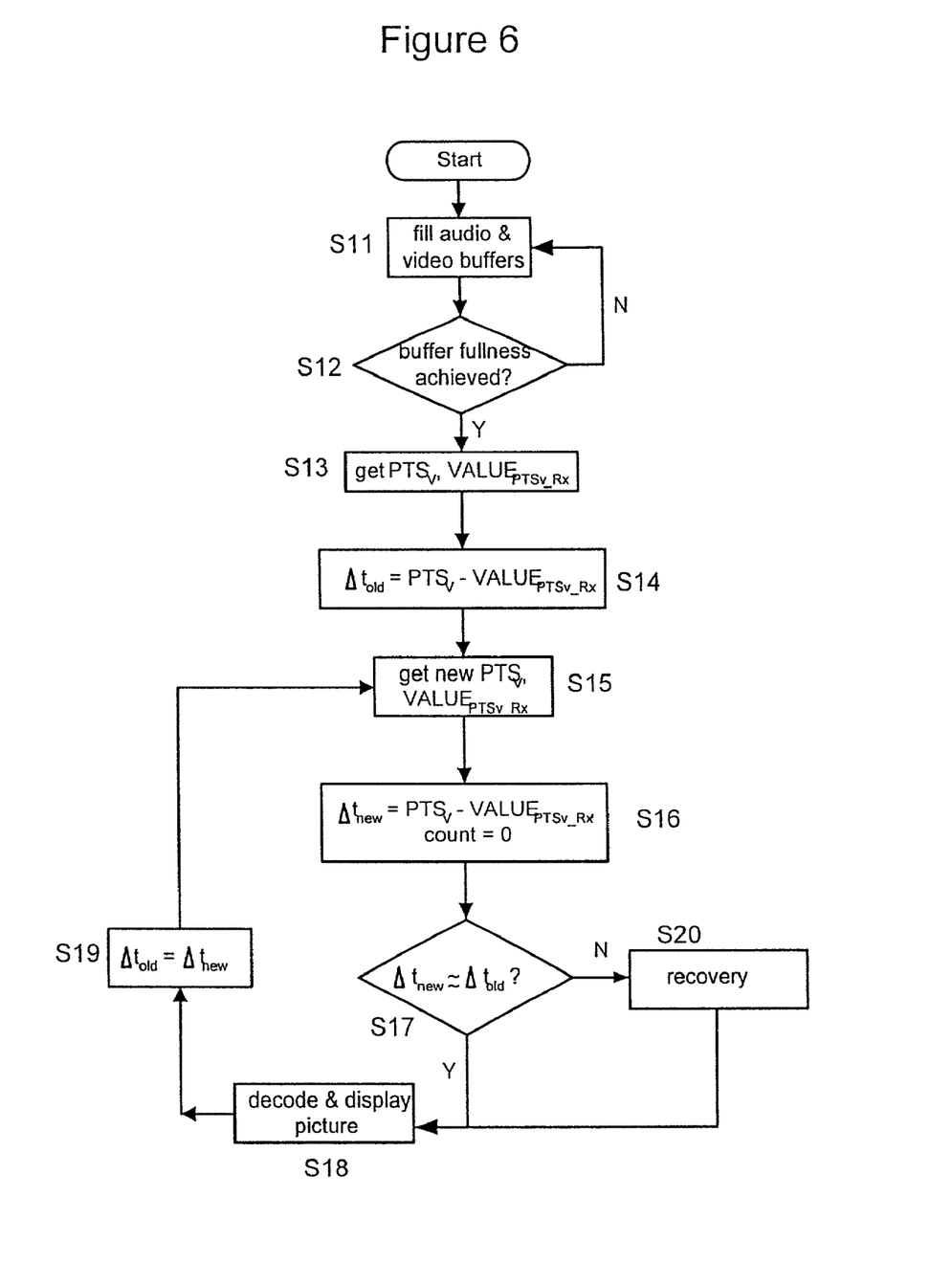
FIG. 6 illustrates a more detailed flowchart based on the steps of FIG. 5.

FIG. 6 illustrates a more detailed flowchart describing the steps of FIG. 5. Before any synchronization can be initiated, the SDRAM 354 needs to be filled to reach a certain criterion. Accordingly, SDRAM 354 is filled (Step S11) with video and/or audio frames until the SDRAM 354 meets a predetermined buffer size (Step S12). Steps S11 and S12 correspond to Step S1 of FIG. 5.

Specifically, at startup or powering on of device 300, no video frame is decoded until a buffer occupancy criterion in SDRAM 354 is met. SDRAM 354 has buffering allocated for both video and audio data. The buffer occupancy criterion is preferably set equal to a predetermined size. For example, this may be the VBV Buffer size. A VBV is a Video Buffering Verifier. The VBV is a hypothetical decoder (as defined in ISO/IEC 13818-2, "Information Technology—Generic Coding of Moving Pictures and Associated Audio Information: Video). The VBV buffer is the input buffer of this hypothetical decoder. The buffer size is set to prevent VBV buffer overflow or underflow when compressed data is placed in the buffer and removed from the buffer. A buffer size of 1,835,008 bits, exemplary in the embodiment, corresponds to a Constant Bit Rate or Variable Bit Rate decoder operation.

Consequently for some broadcasts, the original 32 Kbit allocated for audio data buffering in SDRAM 354 (32 Kbit representing the current standard for chip manufacturers) is increased by an additional 1,409,286 bits. This is done to avoid a buffer underflow/overflow condition. The additional 1,409,286 bits allocated in SDRAM 354 correspond to a worst case scenario, where the audio and video bitrates are 384 Kbps and 500 Kbps, respectively. The amount of additional buffering added to SDRAM 354 may be calculated as follows:

$$\frac{VBV\_buffer\_size}{minimum\_video\_bitrate} * maximum\_audio\_bitrate =$$

$$\frac{1,835,008 \; bit}{500 \; K\frac{bit}{\sec}} * 384 \; K\frac{bit}{\sec} = 1,409,286 \; bits.$$

Steps S13-S16 describe the obtaining of video presentation time stamps for two successive video frames, and the computing of the first and second parameters that are to be compared in the transport processor 330. Steps S13 and S15 correspond to Step S2, and steps S14 and S16 correspond to Step S3 of FIG. 5.

Once the buffer criterion in SDRAM 354 is met, the transport processor 330 performs a software latch of system timer 332 to obtain a value (Step S13) of when the transport processor 330 receives a first interrupt from MPEG A/V decoder 352. This interrupt informs the transport processor 330 that a first $PTS_V$ is present or detected in the SDRAM 354. This latched value, physically accessed from a counter of timer 332, is denoted as $VALUE_{PTSv-Rx}$. Based on the $PTS_V$ and $VALUE_{PTSv-Rx}$ of the first video frame, a first parameter, $\Delta t_{old}$, is computed (Step S14). The first parameter is a initial time difference between reception of the $PTS_V$ of the first video frame and the latching of $VALUE_{PTSv-Rx}$.

Upon receiving a subsequent $PTS_V$ interrupt of a second or subsequent video frame, a new $VALUE_{PTSv-Rx}$ is latched (Step S15). Based on these values, a second parameter $\Delta t_{new}$, which is the new difference between $PTS_V$ and $VALUE_{PTSv-Rx}$, is computed (Step S16). Also in this Step S16, the number of times $\Delta t_{old}$ and $\Delta t_{new}$ differ, denoted as count, is initialized to zero (count=0).

At startup, it is assumed that it takes one video frame time to decode the first video frame. At this point, the transport processor 330 compares the two parameters (Step S17). If $\Delta t_{new}$ equals $\Delta t_{old}$, the subsequent (i.e., second frame that is being compared to reference) video frame is decoded and displayed (Step S18). Preferably, the distance (time) between two $PTS_V$'s should be about a constant, such as about 33 msec apart for example, depending on the frame rate. This is because the validation or synchronization of video frames is tied to the frame rate (frames/sec). The parameter $\Delta t_{new}$ equaling $\Delta t_{old}$ would indicate that the $PTS_V$ of the subsequent frame is valid and legitimate (i.e., no error or corruption in the $PTS_V$). The original first parameter $\Delta t_{old}$ is updated (Step S19) such that $\Delta t_{old}$ equals $\Delta t_{new}$, and the validation process is repeated for subsequent video frames in SDRAM 354. On the other hand, if $\Delta t_{new}$ does not equal $\Delta t_{old}$, then the validation process (Step S20) shifts to a recovery mode, in order to compensate for any errors or inconsistencies in the $PTS_V$'s.

Figure 7:
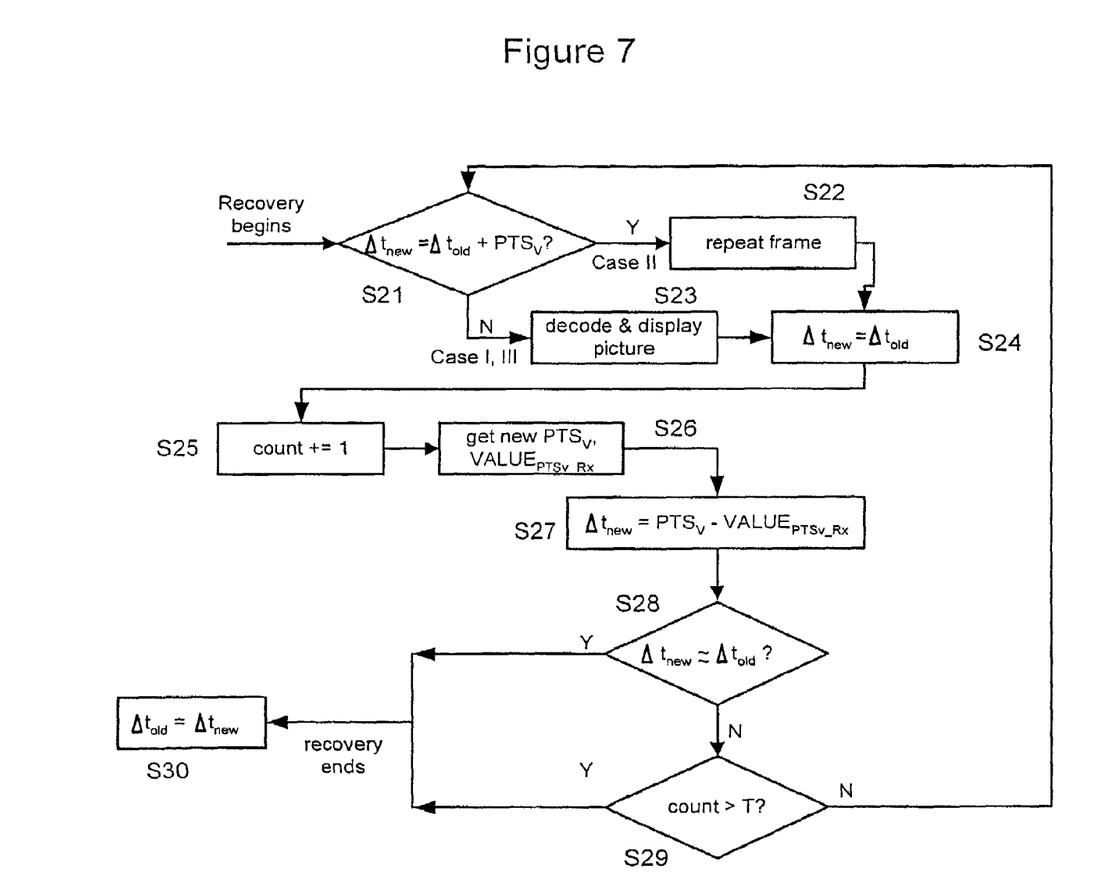
FIG. 7 illustrates exemplary recovery modes based on the recovery step of FIG. 5.

FIG. 7 illustrates exemplary recovery modes based on the recovery step of FIG. 5. There are three scenarios in the recovery mode, Case I, Case II and Case III In Case I, the $PTS_V$ of the first video frame is corrupted but the corresponding video information is valid. In Case II, both the video information and its associated $PTS_V$ of the first video frame are corrupted or lost, but the subsequent video information and associated $PTS_V$ in the subsequent frame are valid. In Case III, the time base for all frames in the DVR system has changed (i.e., from 0 to 100 msec for example). In Case II, there is a discontinuity in the sequence of $PTS_V$ and $PTS_A$ but the new sequence is valid.

Once recovery begins (from Step S20) it is determined whether $\Delta t_{new}$ equals $\Delta t_{old}$ plus the $PTS_V$ of the subsequent frame (Step S21). Under Case I and Case III, this is never the case, so the video frame is decoded and displayed (Step S23) and transports processor 330 sets $\Delta t_{new}=\Delta t_{old}$ (Step S24). Video and audio frames can be decoded and presented glitch-free.

In Case II, $\Delta t_{new}=\Delta t_{old}+PTS_V$. The last valid video frame is repeated (Step S22) and set $\Delta t_{new}=\Delta t_{old}$ (Step S24). Without this Case II mode, even a bad initial $PTS_V$ that is succeeded by a valid subsequent $PTS_V$ results in an erroneous $\Delta t_{new}$. An erroneous $\Delta t_{new}$ causes audio glitch when audio presentation status is evaluated, causing audio frame (s) to repeat or skip. This is explained further in FIG. 8.

In all three cases in the recovery mode, a software counter keeping track of the number of iterations performed in the recovery mode increments by one (Step S25). At the next $PTS_V$ interrupt, the transport processor 330 latches to a counter in timer 332 and the next new $VALUE_{PTSv-Rx}$ is obtained (Step S26). The new time difference $\Delta t_{new}$ is updated (Step S27) just as in FIG. 6. If at the comparison in Step S28 $\Delta t_{new}$ does not equal $\Delta t_{old}$, then the recovery mode is repeated up to T times (Step S29). In other words, the recovery mode is executed at most T times. The value T is user defined, and preferably should be small enough such that the number of video glitches is minimized. Furthermore, the value T should also be large enough so that up to T corrupted $PTS_V$ can be tolerated without causing any audio glitches. In practice, the value T may range from about two to five. Once the recovery mode is executed at most T times or when $\Delta t_{new}$ equals $\Delta t_{old}$ during the recovery mode, the recovery mode ends (Step S30) and the validation part of the synchronization process is resumed, where $\Delta t_{old}$ is set equal to $\Delta t_{new}$, and where transport processor 330 awaits reception of the next $PTS_V$ interrupt for a subsequent frame to begin validation . This is because after T errors, the system assumes that the time base has been changed and that the $PTS_V$ for the frames are correct, having only been changed due to the change in time base.

Figure 8:
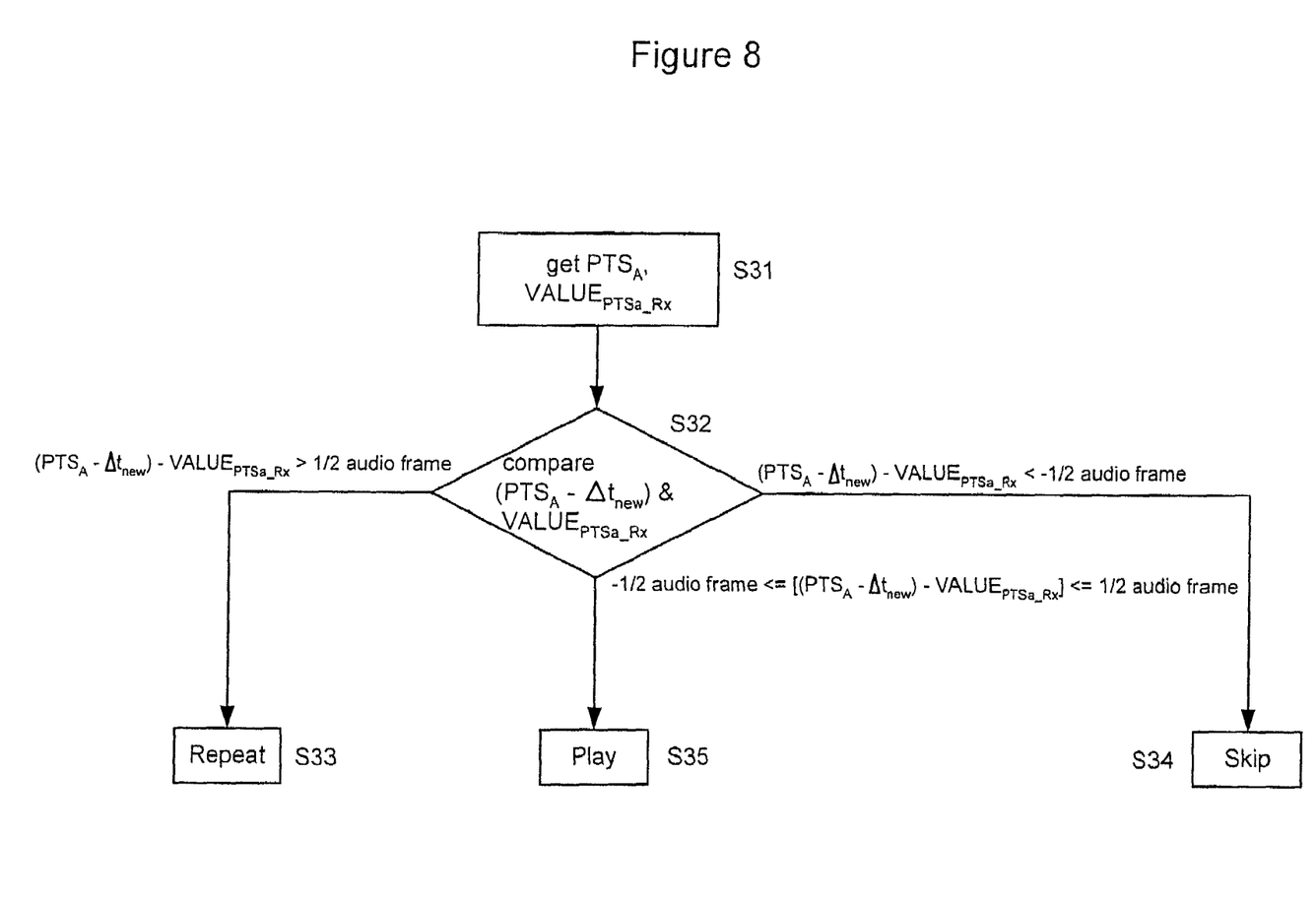
FIG. 8 illustrates synchronization of audio frames with video frames in accordance with the invention.

FIG. 8 illustrates synchronization of audio frames with video frames in accordance with the invention. This process is substantially similar to the process for determining PTS validation in FIGS. 5 and 6 and is done in parallel with video synchronization. Once $PTS_A$ is detected or received (i.e., the transport processor 330 receives an interrupt from MPEG A/V decoder 352), transport processor 330 performs a software latch (Step S31) to the timer 332 counter. $PTS_A$ is mechanically processed exactly like a $PTS_V$. The latched value is denoted as $VALUE_{PTSa\text{-}Rx}$. Computed time and system time are then compared (Step S32). If $(PTS_A\text{-}\Delta t_{new})$, which is the computed time, exceeds $VALUE_{PTSa\text{-}Rx}$ (which is the system time that is latched) by ½ audio frame time, one audio frame is repeated (Step S33). For MPEG-1 audio frames, audio frame time is 24 msec; for DOLBY DIGITAL® frames, this time is 32 msec.

Conversely, when $VALUE_{PTSa\text{-}Rx}$ exceeds $(PTS_A\text{-}\Delta t_{new})$ by ½ audio frame time, one audio frame is skipped (Step S34). However, when $VALUE_{PTSa\text{-}Rx}$ exceeds $(PTS_A\text{-}\Delta t_{new})$ by less than ½ audio frame time or $(PTS_A\text{-}\Delta t_{new})$ exceeds $VALUE_{PTSa\text{-}Rx}$ by less than ½ audio frame time, audio-video synchronization is achieved and audio is presented (Step S35). This is because the difference is small enough so that a viewer cannot perceive any difference between audio and video of displayed content.

The method offers several advantages. System complexity and costs are reduced since no additional hardware components such as an SCR are needed for synchronization. Since an SCR is not required, AV synchronization of both live and recorded content can be done in an identical fashion, as the algorithms may be used for both live and recorded content.

Additionally, since little processing power is wasted in synchronizing audio and video frames, a greater amount of processing power at transport processor 330 is available to perform encryption.

The invention being thus described, it will be obvious that the same may be varied in many ways. The above-described method has been described as comprised of several components, flowcharts or blocks, it should be understood that the method may be implemented in application specific integrated circuits, software-driven processor circuitry, or other arrangements of discrete components. Although explained in terms of video frames, this invention also applies with respect to audio frames. Such variations are not to be regarded as a departure from the spirit and scope of the invention, and all such modifications as would be obvious to one skilled in the art are intended to be included within the scope of the following claims.

What is claimed is:

1. An audio-video (AV) synchronization process, comprising:
   determining whether an occupancy criterion of a buffer storing received audio and video frames has been met, and if so
   obtaining an initial time stamp value from an initial frame;
   obtaining a subsequent time stamp value from a subsequent frame;
   computing an initial parameter based on the initial time stamp value;
   computing a subsequent parameter based on the subsequent time stamp value;
   determining if the computed initial and subsequent parameters coincide, and if so outputting corresponding audio and/or video frames for decoding and display.

2. The process of claim 1, wherein said initial and subsequent time stamp values are presentation time stamps of initial and subsequent video frames or presentation time stamps of initial and subsequent audio frames, each of the audio and video frames also including associated audio or video data.

3. The process of claim 2, wherein if the initial and subsequent parameters do not coincide, a recovery process is performed.

4. The process of claim 3, wherein if the initial and subsequent parameters do not coincide because the presentation time stamp of the initial frame is corrupted but the corresponding video data is valid, or if a time base at which all presentation time stamps are obtained is changed, the video frame is decoded for display.

5. The process of claim 3, wherein, if the initial and subsequent parameters do not coincide because both the presentation time stamp and the corresponding video data of the initial frame are corrupted, the most recently processed video frame is repeated.

6. The process of claim 3, wherein the recovery process is performed up to T times, T being a selectable parameter, and wherein if T is exceeded, the recovery process is terminated.

7. The process of claim 1, wherein said initial and subsequent parameters are difference values, each computed as a time difference between when the corresponding time stamp is received by a processor and a time where the processor accesses a time from a system timer.

8. The process of claim 7, wherein said determining step compares whether the difference value representing the subsequent frame, $\Delta t_{new}$, is equal to the difference value representing the initial frame, $\Delta t_{old}$, the coincidence between these difference values representing a valid time stamp of the subsequent frame.

9. The process of claim 8, wherein the video frame is decoded for display when the timestamp is valid.

10. The process of claim 2, wherein if the frames are audio frames, parameters representing a computed time are compared to a system time in order to determine if an audio frame is repeated in the process, skipped in the process, or decoded for display.

11. The process of claim 10, wherein if computed time exceeds system time by a half of an audio frame time, the audio frame is repeated.

12. The process of claim 10, wherein if computed time lags system time by a half of an audio frame time, the audio frame is skipped.

13. The process of claim 10, wherein if computed time exceeds system time by less than half of an audio frame time, or lags system time by less than half an audio frame, the audio frame is decoded for display.

14. An apparatus for synchronizing audio and video in a digital video recording (DVR) system, comprising:
   a buffer for receiving a plurality of packets having data representing audio and video frames therein;
   a processor for detenniriing whether an occupancy criterion of the buffer storing said received audio and video frames has been met wherein the processor obtains an initial time stamp value from an initial frame and from a subsequent frame, computes initial and subsequent parameters based on the respective initial and subsequent time stamp values, and determines whether the computed initial and subsequent parameters coincide if the occupancy criterion is met, and
   a decoder for decoding audio and/or video frames for display if the parameters coincide.

15. The apparatus of claim 14, wherein said initial and subsequent time stamp values are presentation time stamps of initial and subsequent video frames or presentation time stamps of initial and subsequent audio frames, each of the audio and video frames also including associated audio or video data.

16. The apparatus of claim 14, wherein said initial and subsequent parameters are difference values, each computed as a time difference between when the corresponding time stamp is received by the processor and a time where the processor accesses a time from a system timer.

17. The apparatus of claim 16, wherein the processor compares whether the difference value representing the subsequent frame, $\Delta t_{new}$, is equal to the difference value representing the initial frame, $\Delta t_{old}$, the coincidence between these difference values representing a valid time stamp of the subsequent frame.

18. The apparatus of claim 17, wherein the video frame is decoded for display when the timestamp is valid.

19. The apparatus of claim 14, wherein if the initial and subsequent parameters do not coincide, the processor performs a recovery process.

20. The apparatus of claim 19, wherein if the initial and subsequent pammeters do not coincide because a presentation time stamp of the initial frame is corrupted but corresponding video data of the frame is valid, or if a time base at which all presentation time stamps are obtained is changed, the video frame is decoded and displayed.

21. The apparatus of claim 19, wherein if the initial and subsequent parameters do not coincide because both a presentation time stamp and corresponding video data of the initial frame are corrupted, the most recent video frame processed is repeated.

22. The apparatus of claim 19 wherein the recovery process is performed up to T times, T being a selectable parameter, and wherein if T is exceeded, the recovery process is terminated.

23. The apparatus of claim 14, wherein if the frames are audio frames, parameters representing a computed time are compared to a system time in order to determine if an audio frame is repeated for processing, skipped for processing or decoded for display.

24. The apparatus of claim 23, wherein if computed time exceeds system time by a half of an audio frame time, the audio frame is repeated.

25. The apparatus of claim 23, wherein if computed time lags system time by a half of an audio frame time, the audio frame is skipped.

26. The apparatus of claim 23, wherein if computed time exceeds system time by less than half of an audio frame time, or lags system time by less than half an audio frame, the audio frame is decoded for display.

27. A method of synchronizing audio and video frames, comprising:
- (a) computing an initial parameter based on an initial video time stamp of an initial video frame;
- (b) computing a subsequent parameter based on a subsequent video time stamp value of a subsequent video frame;
- (c) comparing the computed parameters, a coincidence between the two indicating a valid subsequent video time stamp, and
- (d) synchronizing an audio frame to the subsequent video frame based on the valid subsequent video time stamp.

28. The method of claim 27, further comprising repeating steps (b) through (d) for all subsequent video and/or audio frames.

29. A processor for synchronizing audio and video frames, comprising:
- a buffer for receiving a plurality of packets having data representing audio and video frames therein; and
- circuitry for computing a initial parameter based on an initial time stamp value of an initial video frame, and for computing a subsequent parameter based on a subsequent time stamp value of a subsequent video frame,
- wherein the circuitry determines whether the computed initial and subsequent parameters coincide, a coincidence between the two indicating a valid subsequent video time stamp, and
- wherein the processor synchronizes an audio frame to the subsequent video frame based on the valid subsequent video time stamp.

30. The processor of claim 29, wherein an output of the processor contains corresponding audio and/or video frames for decoding and display.

* * * * *